United States Patent
Pekelis et al.

(10) Patent No.: US 9,970,416 B2
(45) Date of Patent: May 15, 2018

(54) ENERGY CONVERSION DEVICE DRIVEN BY WIND POWER

(71) Applicants: Anatoli Pekelis, Ashkelon (IL); Adam Dekel, Ramat Gan (IL)

(72) Inventors: Anatoli Pekelis, Ashkelon (IL); Adam Dekel, Ramat Gan (IL)

(*) Notice: Subject to any disclaimer, the term of this patent is extended or adjusted under 35 U.S.C. 154(b) by 236 days.

(21) Appl. No.: 14/784,386

(22) PCT Filed: Apr. 8, 2014

(86) PCT No.: PCT/IL2014/050339
§ 371 (c)(1),
(2) Date: Oct. 14, 2015

(87) PCT Pub. No.: WO2014/170891
PCT Pub. Date: Oct. 23, 2014

(65) Prior Publication Data
US 2016/0076520 A1    Mar. 17, 2016

Related U.S. Application Data

(60) Provisional application No. 61/813,665, filed on Apr. 19, 2013.

(51) Int. Cl.
*F03D 3/04* (2006.01)
*F03D 3/06* (2006.01)
(Continued)

(52) U.S. Cl.
CPC .............. *F03D 9/002* (2013.01); *F03D 3/005* (2013.01); *F03D 3/02* (2013.01); *F03D 3/04* (2013.01);
(Continued)

(58) Field of Classification Search
CPC .......... F03D 3/005; F03D 3/02; F03D 3/0427; F03D 5/04; F03D 9/34; F03D 9/43;
(Continued)

(56) References Cited

U.S. PATENT DOCUMENTS 244,677 A * 7/1881 Sherwood ................ F03D 3/00
                                                    416/117
362,557 A * 5/1887 Vanpelt .................. B63H 21/28
                                                    188/74
(Continued)

FOREIGN PATENT DOCUMENTS

WO    WO 2013054085    *    4/2013

OTHER PUBLICATIONS

International Search Report for corresponding PCT application—PCT/IL2014/050339—4 pages, dated Jul. 7, 2014.
(Continued)

*Primary Examiner* — Woody Lee, Jr.
*Assistant Examiner* — Brian O Peters
(74) *Attorney, Agent, or Firm* — Roach Brown McCarthy & Gruber, P.C.; Kevin D. McCarthy

(57) ABSTRACT

The invention is an energy conversion device driven by wind power, comprising a housing to protect the working components of the device from environmental damage and to insure correct flow of air through the device, at least one directing element, connected to the housing, air exit and entrance openings, one or more separating surfaces inside the housing, inside components forming a carousel, a frame structure surrounding the components inside the housing, set of sails, wherein each sail is comprised of a pair of blades connected by a hinge-like structure, wherein the free end of one of said blades is connected to said separating surface by a rail and the free end of the other of said blades is connected to a fixed point on said frame structure, a transmission system and lifting means for adjustment of the height of the structure above the ground or water.

2 Claims, 13 Drawing Sheets

(51) Int. Cl.
- *F03D 9/00* (2016.01)
- *F03D 3/02* (2006.01)
- *F03D 3/00* (2006.01)
- *F03D 80/80* (2016.01)
- *F03D 15/00* (2016.01)
- *F03D 13/20* (2016.01)
- *F03D 9/25* (2016.01)

(52) U.S. Cl.
CPC ............ *F03D 3/0427* (2013.01); *F03D 3/062* (2013.01); *F03D 3/064* (2013.01); *F03D 3/068* (2013.01); *F03D 9/25* (2016.05); *F03D 13/20* (2016.05); *F03D 15/00* (2016.05); *F03D 80/88* (2016.05); *F05B 2240/218* (2013.01); *Y02E 10/74* (2013.01)

(58) Field of Classification Search
CPC . F03D 9/45; F03D 13/20; F03D 15/00; F03D 80/80; F03D 80/88
See application file for complete search history.

(56) References Cited

U.S. PATENT DOCUMENTS

| | | | | |
|---|---|---|---|---|
| 665,891 A * | 1/1901 | Fetty | ............... | F03D 3/00 416/117 |
| 797,140 A * | 8/1905 | Miller | ............... | F03D 3/00 416/118 |
| 1,964,347 A * | 6/1934 | Ford | ............... | F03D 3/068 416/111 |
| 4,260,325 A | 4/1981 | Cymara | | |
| 6,629,815 B2 * | 10/2003 | Lusk | ............... | F03D 3/005 415/4.2 |
| 8,282,350 B2 * | 10/2012 | Corrado | ............... | F03D 3/067 290/44 |
| 8,360,713 B2 * | 1/2013 | Carosi | ............... | F03D 3/02 415/4.2 |
| 8,657,575 B2 * | 2/2014 | Morris | ............... | F03B 17/06 416/79 |
| 9,115,685 B2 * | 8/2015 | Ross | ............... | F03B 13/264 |
| 2004/0001752 A1 | 1/2004 | Noble | | |
| 2009/0297347 A1 * | 12/2009 | Burr | ............... | F03B 17/067 416/98 |
| 2011/0133471 A1 | 6/2011 | Chung | | |
| 2012/0043762 A1 | 2/2012 | Lee | | |
| 2013/0017084 A1 * | 1/2013 | Anderson | ............... | F03D 3/005 416/1 |

OTHER PUBLICATIONS

Written Opinion of the International Searching Authority for corresponding PCT application—PCT/IL2014/050339—5 pages, dated Jul. 7, 2014.

* cited by examiner (section A-A)

(section B-B)

ENERGY CONVERSION DEVICE DRIVEN BY WIND POWER

FIELD OF THE INVENTION

The present invention relates to the field of wind power. More particularly, the invention relates to the conversion of the kinetic energy of the wind, into another form of energy, by using a wind turbine or a windmill.

BACKGROUND OF THE INVENTION

Wind energy can be converted in a windmill and used to produce mechanical work. A wind turbine uses that mechanical work to produce electricity by applying said work to rotate a generator. The efficiency of the device is the ratio between the energy produced by the device, and the wind energy that enters the device. To avoid significant energy loses, as much wind energy as possible must be converted to kinetic energy that contributes to the desirable movement of the device.

Many modern windmills and wind turbines comprise a vertical tower, attached to the ground, which provides a stable base for the device and elevates it up to a height where the velocity of the wind is suitable to operate the device. The velocity of the wind generally increases with elevation. The structure is exposed to the wind and can be damaged by it, if the wind is too powerful compared to the limitation of the material properties of the structure. The structure is exposed not only to the force of the wind, but also to other weather conditions, such as rain, lightning, storm, sunlight, humidity, etc.

Near the top of the tower there is a device suitable to be driven by the wind. In many cases, said device is a fan-like set of blades, wherein each blade is twisted for the purpose of being aerodynamically fit for smooth movement though the air. That device usually moves in a circular motion, by utilizing the wind and the aerodynamic shape of the surface. The circular motion occurs around an axis, connected to the top of the tower, and the plane in which the circular motion occurs is usually perpendicular to the ground, but can also be horizontal.

When the wind hits a surface which is at some distance from the central axis, a moment is created. The size of the moment is in direct proportion to the force produced by the wind and the distance between the central axis and the point where the wind hits the blades. To produce greater power, the blades need to be as long as possible, to create a large moment, but as the length of the blades grow, so does their weight, and a large velocity of wind is required to cause motion. On the other hand, if the wind is too strong the device can be damaged. To avoid such damage or low efficiency, the longest length for the blades is determined by the largest moment permitted on the device in order to avoid excessive abrasion or material fatigue, and the shortest length is usually determined by the amount of desired output.

It is an object of the present invention to provide a device and method that overcome the drawbacks of the prior art.

It is another object of the invention to provide a device that can be adjusted in order to exploit the wind power to its maximum, at any given time.

Other objects and advantages of the invention will become apparent as the description proceeds.

SUMMARY OF THE INVENTION

The invention is an energy conversion device driven by wind power, comprising the following components: a housing, at least one directing element, air exit openings, one or more separating surfaces inside the housing, a frame structure surrounding the components inside the housing, hinge-like structures connected to said separating surface by a rail and to a fixed point at said frame structure, a transmission system and lifting means.

DETAILED DESCRIPTION OF THE INVENTION

Figure 1A:
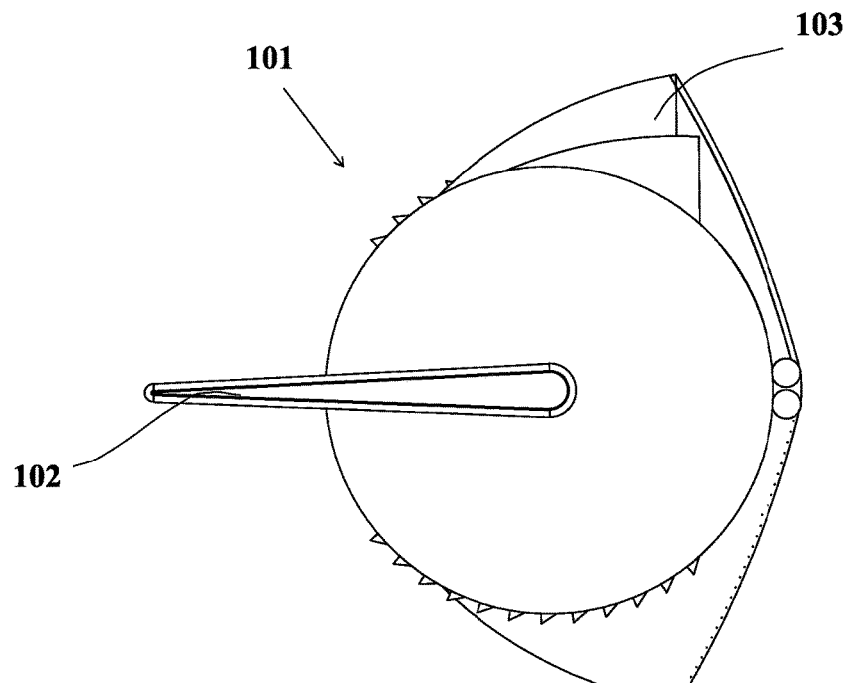
FIG. 1A is a schematic top view of the housing according to one embodiment of the invention.

The invention is a device and a method for using the wind to produce energy, by using the wind to cause a motion of a mechanical arrangement and transferring the motion into desired form of energy, such as kinetic or electric energy.

In order to understand the invention, a general description of the device is now presented, followed by a more specific description of each of the parts with number references and reference to the attached drawings herein below.

General Description

The outer cover of the device is a housing, containing all of the parts that are responsible for the movement used to produce the energy. There are several openings to the housing—exit openings and entrance openings, from which the wind enters and exits the housing. Herein, the entrance openings are defined to be at the front of the housing and the exit openings are at the back of the housing.

The moving parts of the apparatus of the invention are at least one pair of carousel-like structures on which are mounted a set of sails As the wind enters the housing it impacts some of the sails that are located near the entrance openings and causes the carousels to move around the central axis. The two carousels are separated by a surface with a changing slope.

The sails are comprised of two blades that are connected together by a hinge. One end of each sail is slidingly connected to a rail mounted on the sloped surface t and the other end of each sail is fixedly connected to a rail on a cage-like structure, which is the framework of the carrousel.

More than one surface with the changing slope can be provided thereby allowing for three or more carousels within the housing.

When the sails move in a circular motion along the rail, they cause a cage-like structure around them to move in a circular motion around the central axis as well. The cage-like structure is connected to a main vertical shaft and therefore causes the rotation of the main shaft. When there is a carousel on each side of the surface with the changing slope, each carrousel is responsible for the rotation of a different cage-like structure, so that each of the structures will contribute to the rotation of the main shaft. The housing and its entrances and exits are arranged so that the carousel on the top of a sloped surface moves in the opposite direction of the one on the bottom of the surface.

For maximum entrance of the wind into the housing, the housing is provided with a directing element, at its top, that acts as a sail and allows the wind to rotate the housing in order to position the housing for best wind entrance. The optimal position is when the wind has direct entrance into the housing through the entrance openings.

It is recommended to place the device upon some kind of elevated structure, such as a tower-shaped structure, hereinafter—a tower. The device is supported by the tower at the desired height, which in some embodiments is adjustable. The tower can contain a mechanical transmission system to transfer the rotational energy of the carousels to a generator, etc.

Figure 1B:
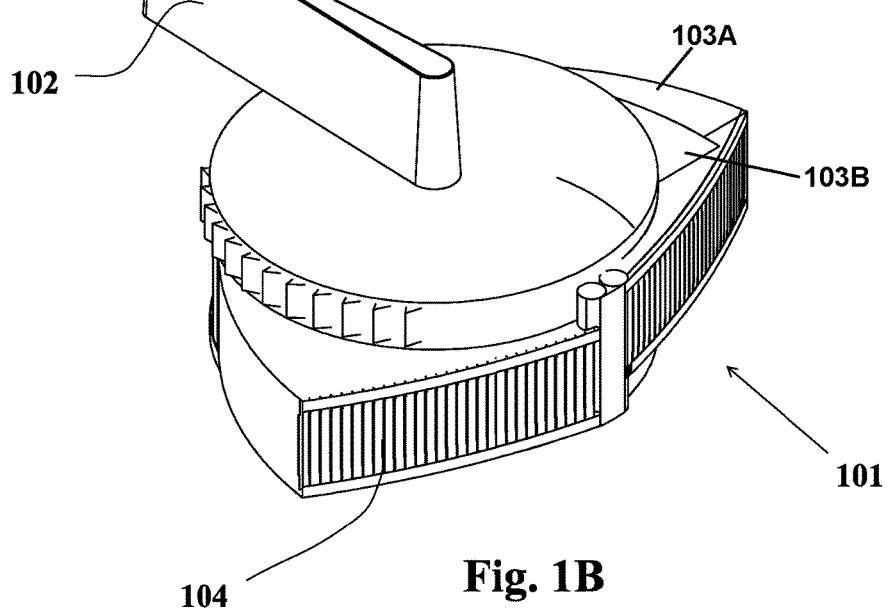
FIG. 1B is a schematic perspective view of the housing according to one embodiment of the invention.

In FIG. 1A the housing 101 is schematically described in a top view. FIG. 1B also illustrates the housing 101, but in a perspective view. In both drawings the shape of the housing 101 is apparent and so are some of the external features. The external features show: a directing element 102, wings 103 and louvers 104. The purpose of each external feature is described in details as the description proceeds.

The housing 101 rotates around a vertical axis, co-axial with that of the tower. The rotation is caused by a directing element 102 that is attached to the housing 101. Directing element 102 acts as a long arm on which a moment is induced by the impact of the wind. The housing 101 will rotate until the forces on the directing element 102 are equal on both of its sides, at which time the directing element is aligned with the wind.

When the directing element 102 is aligned with the direction of the wind, the louvers 104 that are located at the entrance openings are facing the wind and allowing it to enter through them and causing a controlled access of wind inside the housing 101. Louvers 104 can be adjusted to reduce the openings when the pressure inside the housing is too high or to increase the openings for better passage of wind when the wind velocity is low. The louvers 104 also protect the inside components from rain, sunlight, or any other environmental condition.

Other air passages are the wings 103a and 103b. The wings 103a and 103b allow the wind to enter the housing 101. The positioning of the wings 103a and 103b is suitable for an optimal movement of the inside carrousels. Each wing 103a and 103b allows the passage of the wind at locations where the sails need yet another push to keep the rotation. Another set of wings 103a and 103b is placed on the bottom side of the housing 101, on the opposite side from the firm set of wings 103a and 103b, each set for a different carrousel, where the sails need the additional force.

Figure 2A:
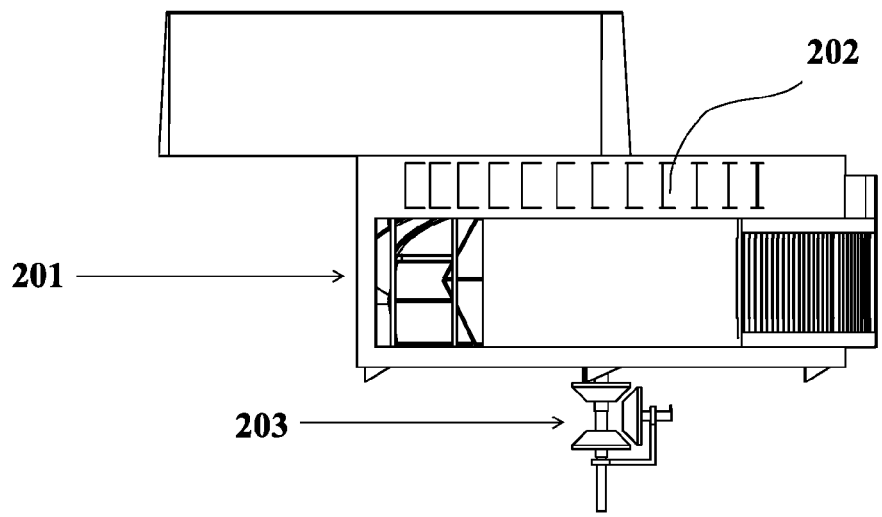
FIG. 2A and FIG. 2B are schematic symmetrical side views of the device, according to one embodiment of the invention.
Figure 2B:
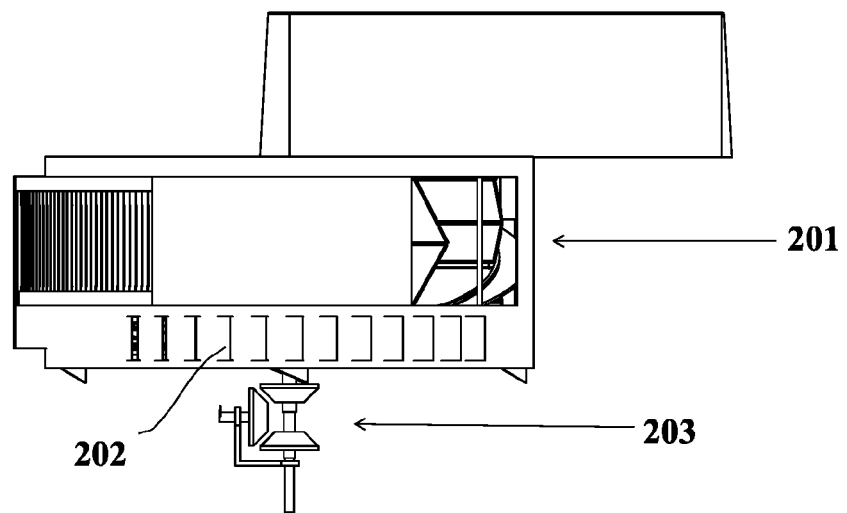

FIG. 2A and FIG. 2B illustrate schematically the housing 101 in side views. Those views reveal the exit openings 201 from which the wind exits the housing 101. Another exit for the wind is the nozzles 202. Each opening—the exit opening 201 and the nozzles 202, is positioned with regard to the amount of air that must exit the housing 101 at the specific location of the openings 201 and 202 in order to prevent back pressure that can hinder or even stop the rotation of the carousels.

Another component revealed in FIGS. 2A and 2B is the mechanical transmission 203 which transfers the motion from the cage-like structures to a main shaft that can operate a generator, for example. The transmission as shown in the figures is only an example of a possible transmission, and in no way obligating.

Figure 3A:
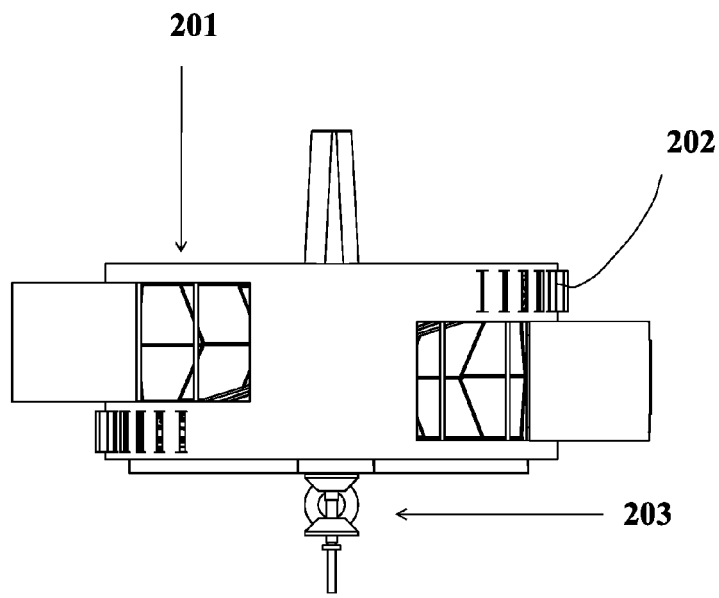
FIG. 3A is a schematic back view of the invention, according to one embodiment of the invention.

FIG. 3A is a back view of the housing 101 wherein can be seen both exit openings 201 and a back portion of the nozzles 202 on both sides. A partial view of the carousel is shown in FIG. 3A. When the wind enters the housing 101 through the louvers 104 it comes in contact with the inside components and causes their movement around the center. The movement of those parts and the way they function will be described in details in reference to FIGS. 4 through 8.

Figure 3B:
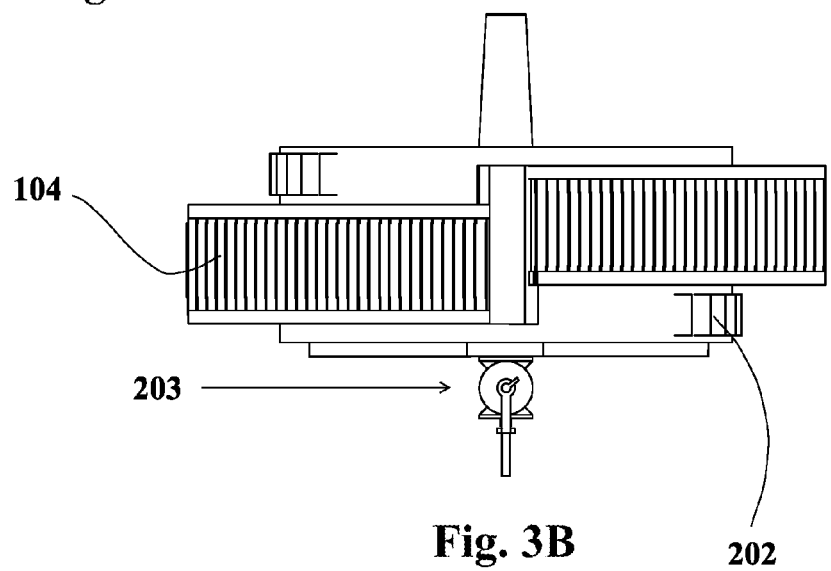
FIG. 3B is a schematic front view of the invention, according to one embodiment of the invention.

FIG. 3B is a front view of the housing 101 wherein the front portion of the nozzles 202 can be seen. There is also a full view of the louvers 104. The louvers 104 can be opened by rotating around a vertical axis, as schematically illustrated in FIG. 3B, but can also rotate around a horizontal or a slanting axis, or open in any other way, like sliding on a rail for example. The louvers 104 can be operated manually, automatically, remotely, or according to the input of sensors etc. The opening of the louvers 104 is determined according to the instantaneous wind velocity with relation to the maximum wind velocity allowed to safely rotate the components.

The wind entering the housing 101 comes in contact with the sails of the carousel. FIGS. 4 through 11 demonstrate the purpose of each inner component that comprises the carousel, their shape, and refers to the manner in which they move.

Figure 4:
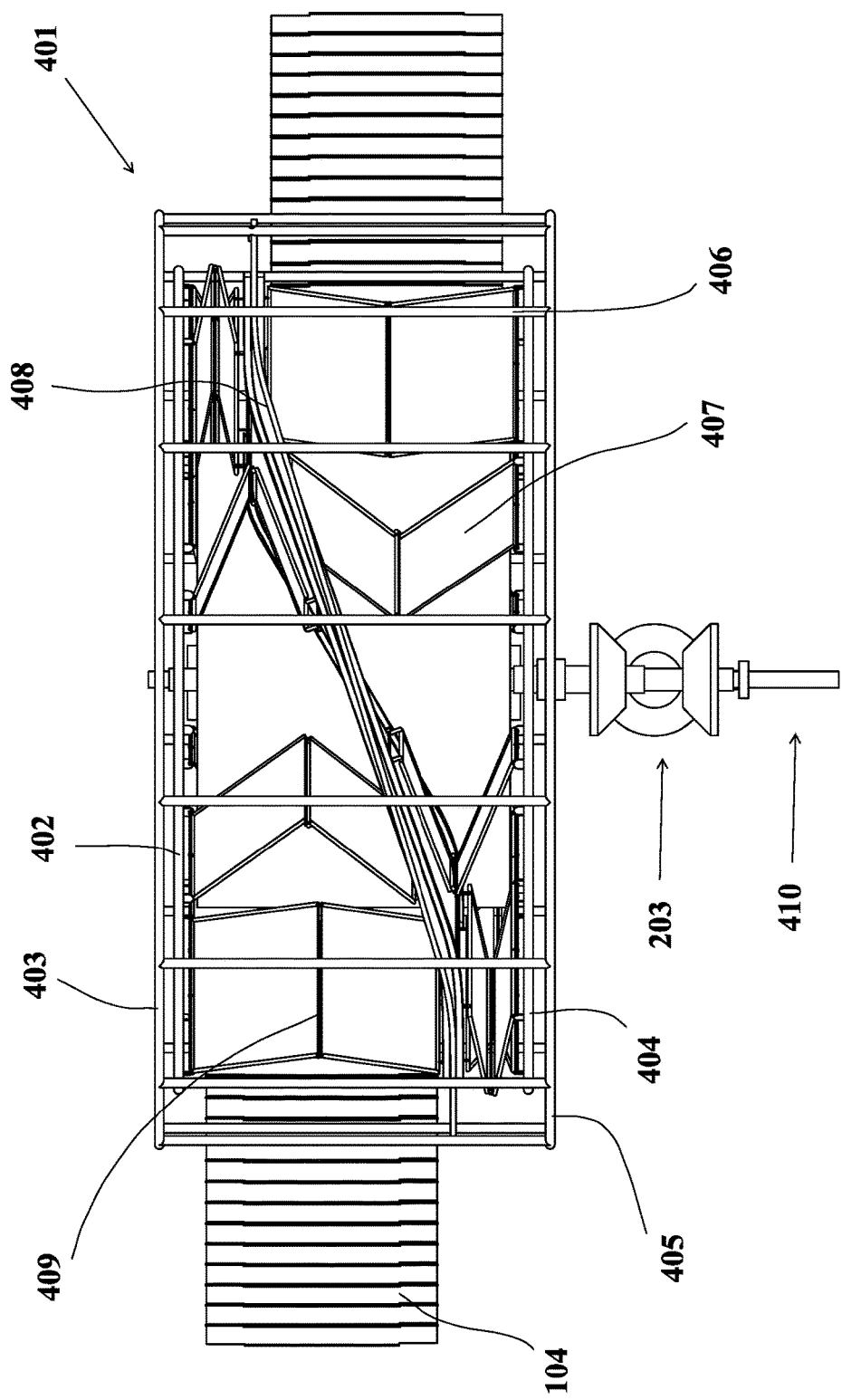
FIG. 4 illustrates schematically the inner structure according to one embodiment of the invention, without the housing.

In FIG. 4 the housing 101 has been removed. The inner components are surrounded by a frame 401 comprising of an upper inner circle 402 and a lower inner circle 404, connected to each other by vertical supporting rods 406, and an upper outer circle 403 and a lower outer circle 405, also connected by vertical supporting rods 406. Each structure of an upper circle, a lower circle and vertical supporting rods, forms a cage-like structure, wherein both cages are connected to the same main shaft 410 through the transmission 203 in a way that allows every cage to contribute to the rotation of the main shaft 410.

There are at least two sections to the inner space, containing the carousels, separated by a surface 408, wherein the sections are the same (only the movement of the carousels is in an opposite directions). The surface 408 creates height changes, since the form of the surface is not a straight plane, in fact it is a surface with a changing slope. On each side of the surface there are sails made up of two blades 407, wherein a first blade 407 is connected to the surface 408 at one end and to the second blade 407 on its other end, by a hinge-like rotational axis 409. The second blade 407 is connected at its other end to one of the inner circles 402. The hinge-like axis 409 that connects the two blades 407 of each sail allows the blades to open and close in a book-like fashion according to the distance between the ends of the sails—in this case the distance is the vertical height at every point between the surface 408 and the frame 401 as the carousel rotates.

Figure 5:
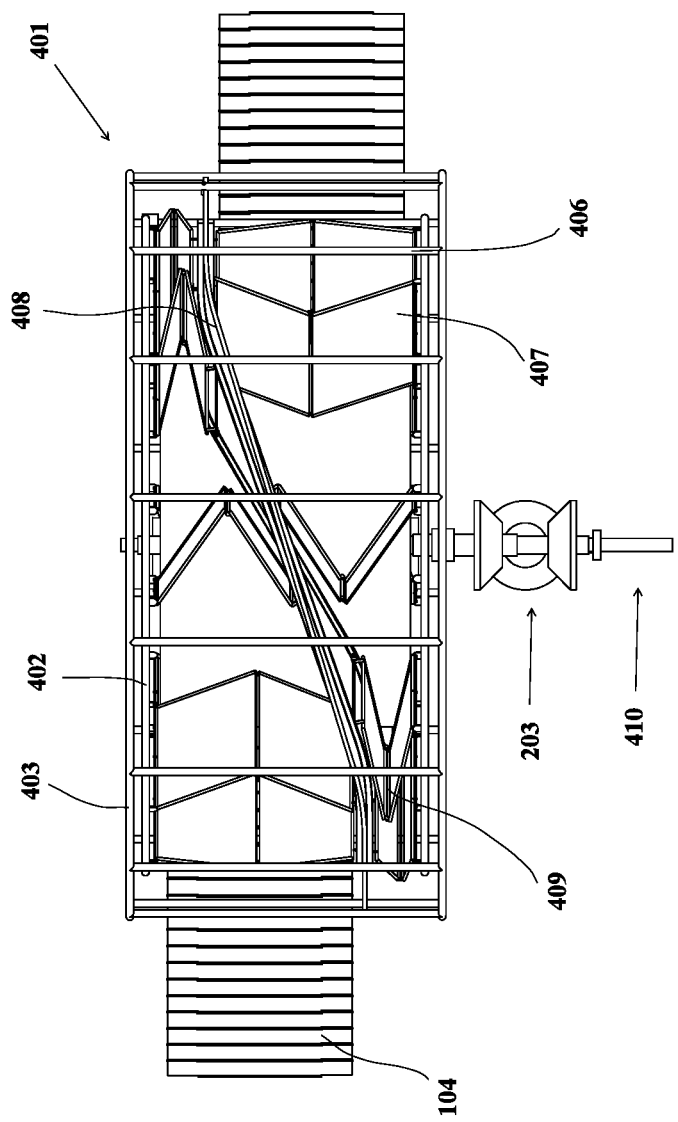
FIG. 5 illustrated schematically the structure without the housing, as in FIG. 6, but in another positioning of the blades.
Figure 6:
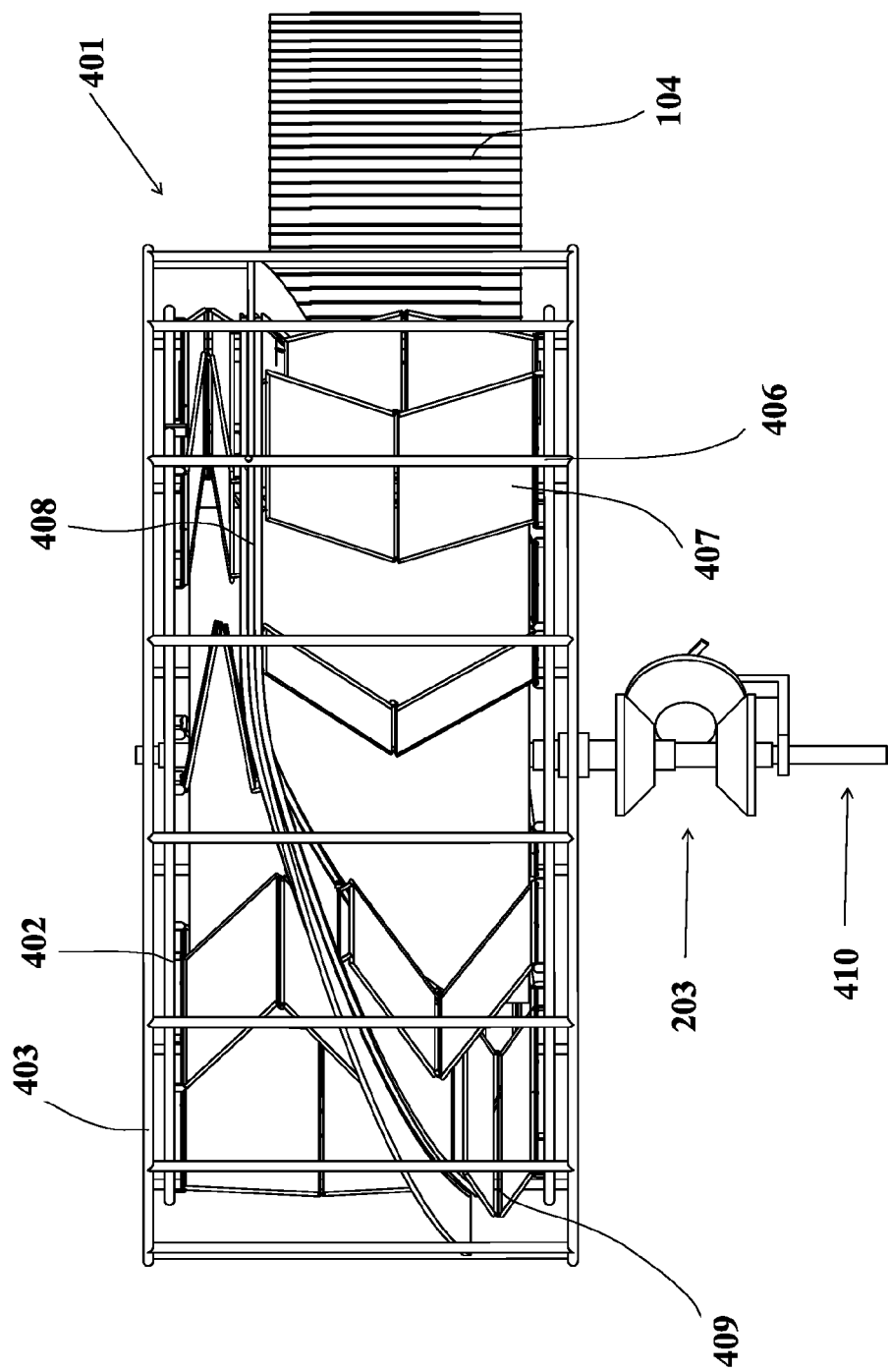
FIG. 6 also illustrates schematically the structure without the housing, from a side view.

FIGS. 4 and 5 are back views of the device without the housing 101, and the difference between them is only the angle of the rotation, in order to demonstrate the rotation of the sails and how the blades 407 "open" and "close". FIG. 6 is also a view of the device without the housing 101, but in a side view.

Figure 7A:
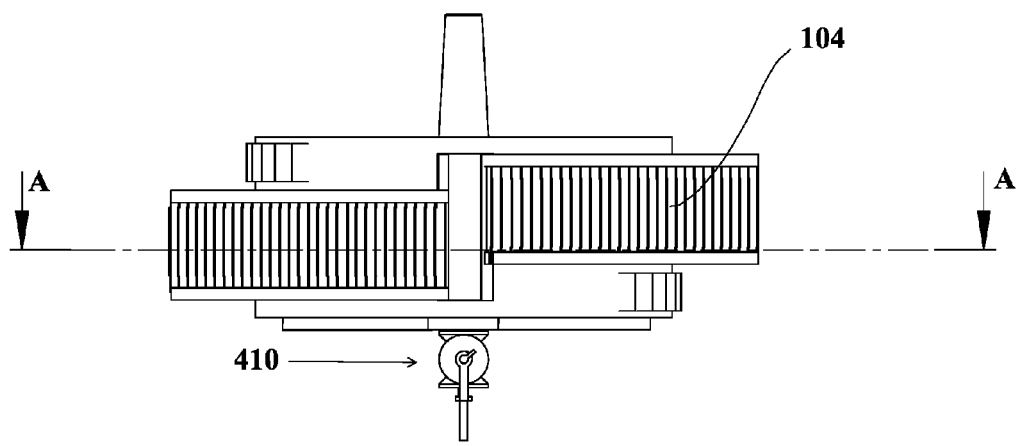
FIG. 7A is schematic front view of the energy conversion device, according to one embodiment of the invention.
Figure 7B:
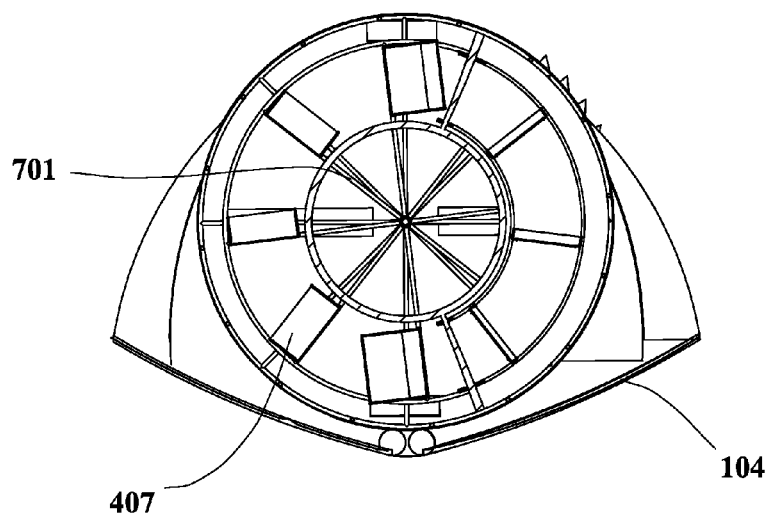
FIG. 7B is a schematic horizontal cross-sectional view A-A of FIG. 7A.

FIG. 7B is a horizontal cross-sectional view A-A of FIG. 7A, wherein the blades 407 of the sails are presented in a top view at several locations along the rotational path of the carousel. As shown in this figure, the cage-like structures are connected to the central axis by supporting rods 701. The width of the blades 407 in a top view indicates the location along the surface 408 and the height of the location in question—as the sail comes to the greatest distance between the ends of its blades 407 ends, its width as seen in a top view would come to a minimum, and accordingly, as shown in FIG. 7B, the impact of the wind that comes through the louvers 104, hits the blades 407 and causes the hinge-like structure they form to open, and therefore increase the distance between the distal ends of the two blades 407. Since one blade 407 is connected to the frame 401 to a fixed point, and the other blade 407 can move along a rail positioned on the surface 408, the push of the blades 407 toward a higher point inflicts a rotational movement of the blades 407 along the rail on the surface 408 and around the center of the device. One set of blades 407 is connected to the inner circles 402 and 404 of the frame 401, and the other to the outer circles 403 and 405 of the frame 401, so each set of blades contributes to the rotation of the main shaft 410.

Figure 8A:
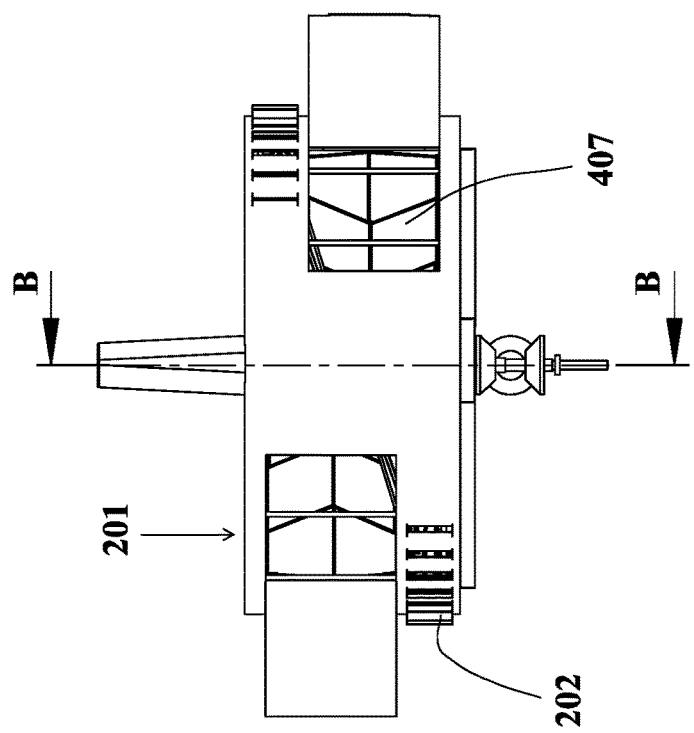
FIG. 8A is a schematic back view of the energy conversion device, according to one embodiment of the invention.
Figure 8B:
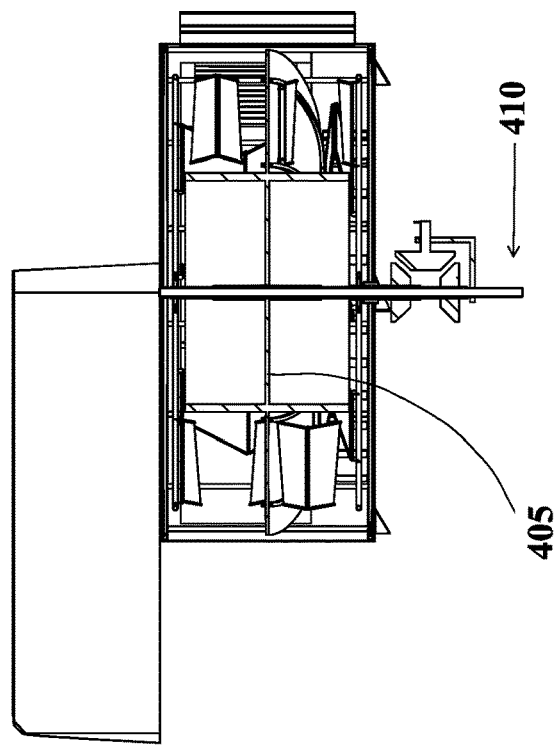
FIG. 8B is a schematic vertical cross-sectional view B-B of FIG. 8A.

FIG. 8B is a vertical cross-sectional view B-B of FIG. 8A, wherein both sections of the inner space are clearly separated by the surface 408, and it can be seen that the inner and the outer circles 402, 403, 404 and 405 are connected to the main shaft 410 and contribute to its rotation. FIG. 8A shows that the blades 407 of the sails reach the exit openings 201 in an open state, and therefore push the air from the inner space through the exit openings 201. The nozzles 202 evacuate the air when the blades 407 are closing, in order to allow the closing to occur. The nozzles 202 are necessary for the continuity of the rotation because trapped air inside the housing 101 will hinder the rotation and can cause it to stop.

Figure 9:
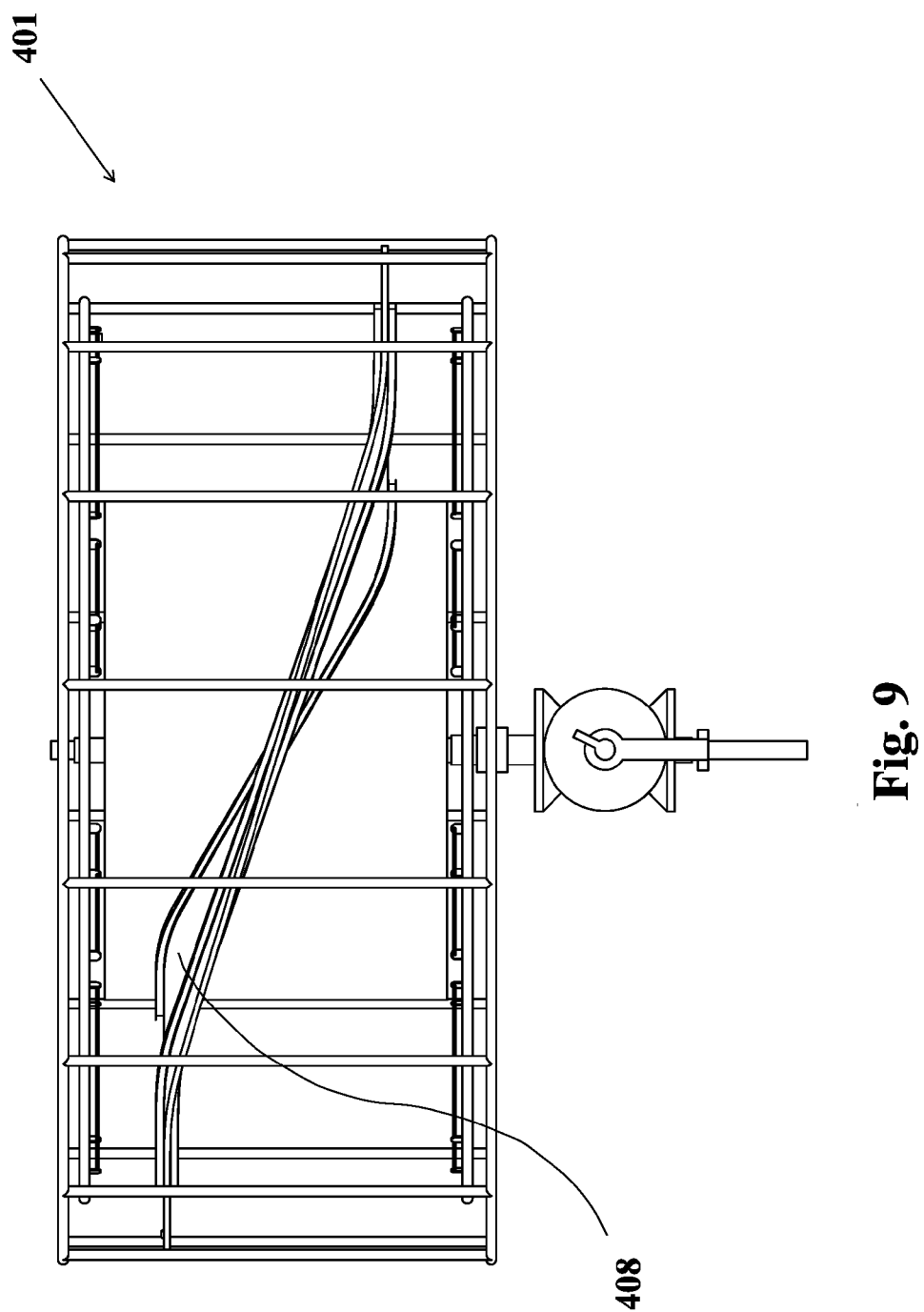
FIG. 9 illustrates schematically the structure without the housing, the blades and the louvers.
Figure 10:
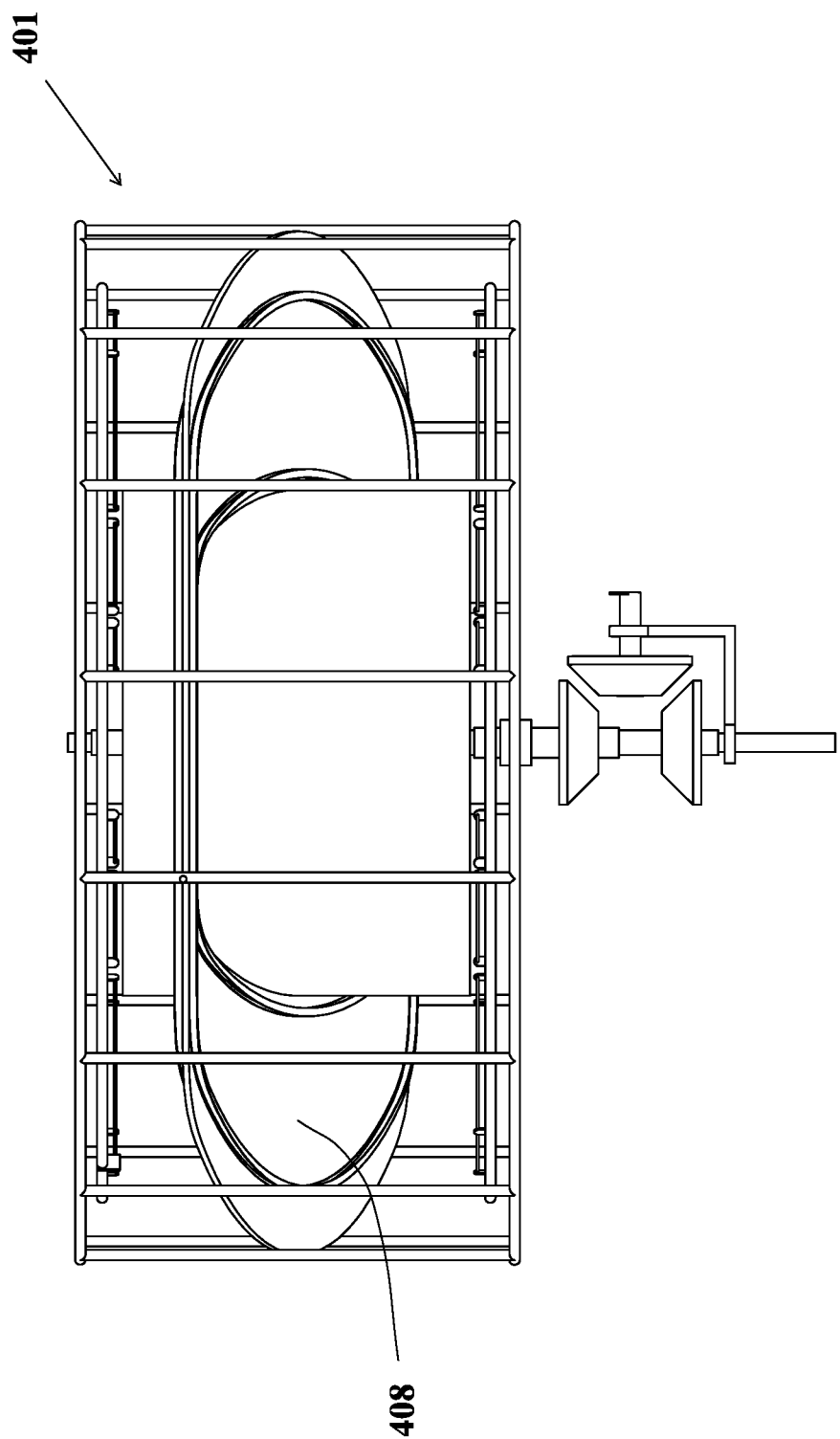
FIG. 10 illustrates schematically the structure without the hosing, the blades and the louvers, as in FIG. 9, but in another rotational angel.
Figure 11:
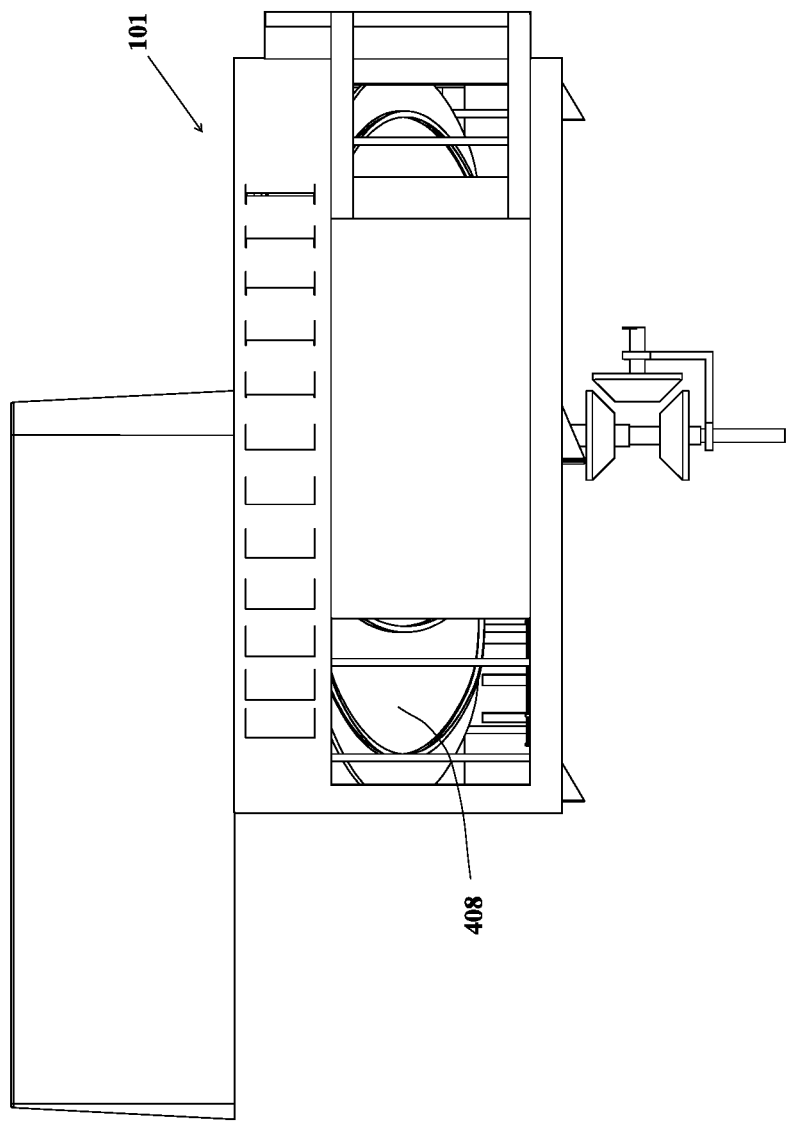
FIG. 11 illustrates schematically the structure without the blades, from a back view.

FIGS. 9 and 10 show the frame 401 and the surface 408, separated from all of the other inner component, to demonstrate the shape of the surface 408, according to one embodiment of the invention. FIG. 11 permits an inside view on the surface 408, through the exit openings 201, without the blades 407.

Figure 12:
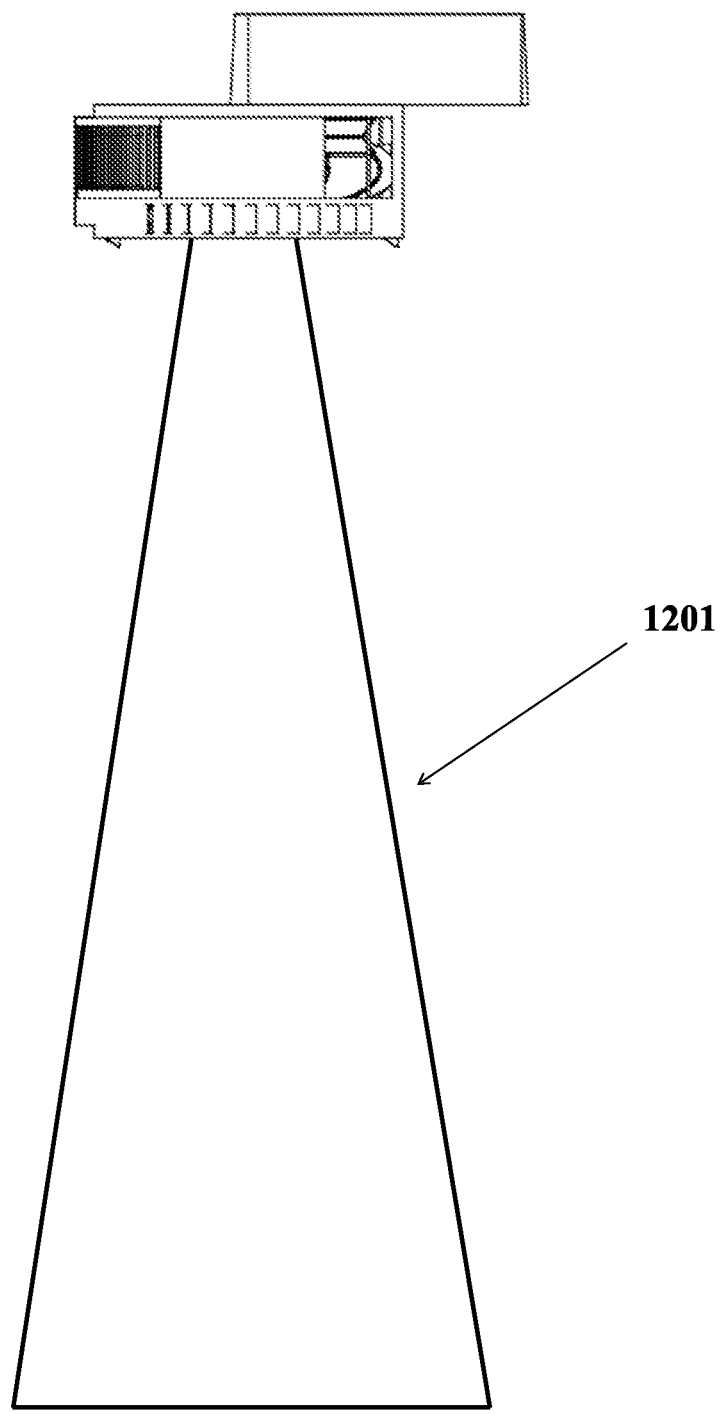
FIG. 12 is a schematic side view of the of the invention, placed on a tower, according to one embodiment of the invention.
Figure 13:
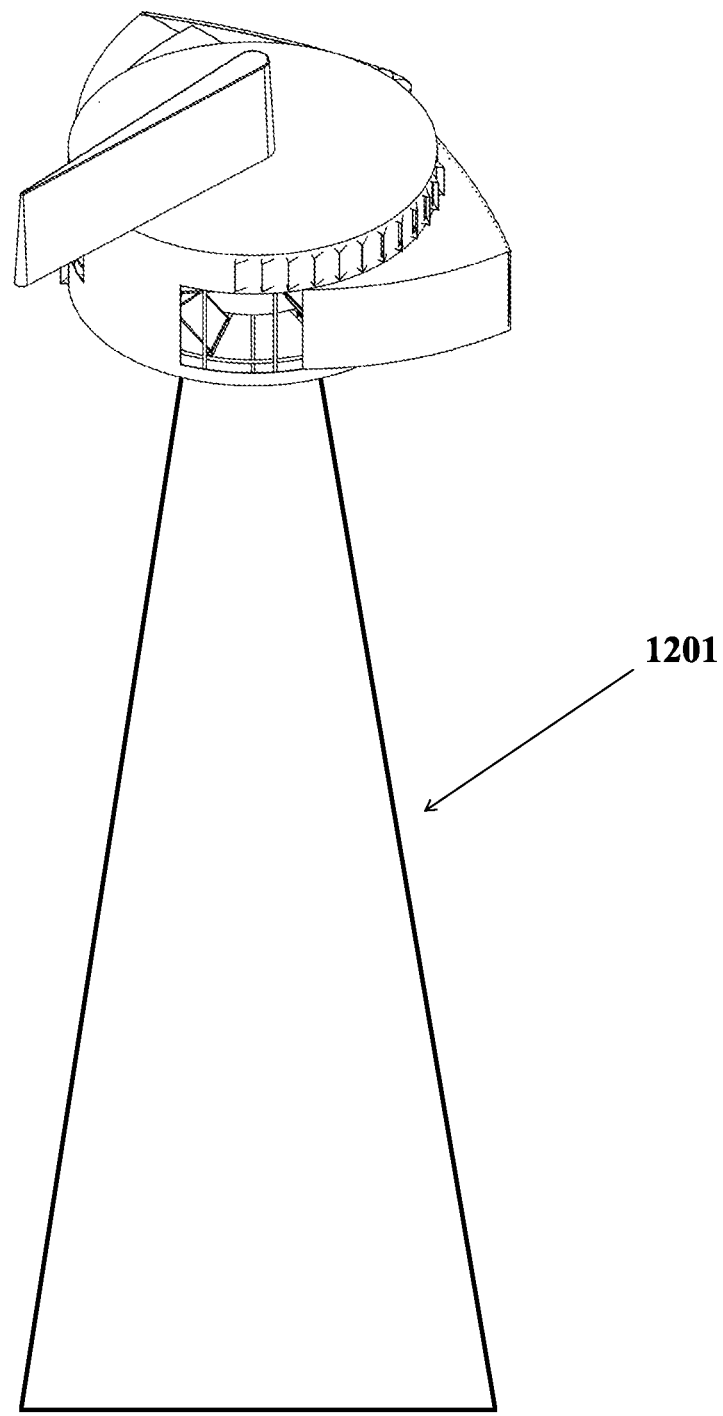
FIG. 13 is a schematic perspective view of the invention, placed on a tower, according to one embodiment of the invention.

FIG. 12 illustrates schematically the device, placed at a top of a tower 1201 in a side view, according to one embodiment of the invention. FIG. 13 is another illustration of the device upon a tower 1201, but in a perspective view. Although FIGS. 12 and 13 illustrate the use of a tower as a supporting structure, the device can be supported by any structure suitable to place the device at the desired height, such as a balloon, floating in the air and dangling the device from a cable or on the roof of a building.

All the above description has been provided for the purpose of illustration and is not meant to limit the invention in any way. The invention presents significant advantages over the existing art. For example, the positioning of the structure is adjustable and suitable for maximizing the air power entering the device by the rotation of the structure according to the direction of the wind. In addition, the cover keeps the surface of the blades from environmental damages.

The invention claimed is:

1. An energy conversion device driven by wind power, comprising:
   a) a housing to protect working components of the device from environmental damage and to ensure correct flow of air through the device;
   b) at least one directing element, connected to the housing;
   c) air exit and entrance openings;
   d) one separating surface inside the housing;
   e) a transmission system; and
   f) a supporting structure for adjustment of the height of the structure above the ground or water;
   characterized in that:
   i) the separating surface has a changing slope; and
   the energy conversion device further comprising:
   ii) a frame structure surrounding the working components inside the housing, the frame structure comprising two pairs of upper and lower inner circles, wherein for each pair an upper inner circle is joined to a lower inner circle by vertical support rods, each pair forming a carousel that is connected to a main vertical shaft at the center of the of the device; and
   iii) one pair of sails, wherein each sail is comprised of a pair of blades, wherein:
   for a first sail, a first end of a first blade is slidingly connected to a rail mounted on a top side of the separating surface and a second end of the first blade is connected to a first end of a second blade by a hinge and the second end of the second blade is fixedly connected to an upper inner circle of the frame structure; and
   for a second sail, a first end of a first blade is slidingly connected to a rail mounted on a bottom side of the separating surface and a second end of the first blade is connected to a first end of a second blade by a hinge and the second end of the second blade is fixedly connected to a lower inner circle of the frame structure;
   wherein:
   when wind enters the housing through the entrance openings it impacts the sets of sails, thereby causing each of the carousels to rotate in a different direction; and
   as each carousel rotates the sloping shape of the separating surface causes the distance between the rails on its top and bottom sides and the upper and lower inner circles of the frame structure to increase and decrease, thereby forcing the first and second blades of each of the first and second sails to pivot about their respective hinges, thereby changing the height, and thereby the surface area that is exposed to the wind, of each sail.

2. The energy conversion device of claim 1 comprising at least two separating surfaces having changing slopes, at least two pairs of sails and at least two carousels inside the housing; wherein each separating surface has a pair of sails and a carousel associated with it.

* * * * *